United States Patent

O'Malley

[15] 3,688,882
[45] Sept. 5, 1972

[54] FLUID OPERATED CLUTCH WITH ONE WAY ENGAGER

[72] Inventor: John J. O'Malley, Livonia, Mich.
[73] Assignee: General Motors Corporation, Detroit, Mich.
[22] Filed: Aug. 16, 1971
[21] Appl. No.: 171,939

[52] U.S. Cl............192/85 AA, 192/41 R, 192/54, 192/83, 192/45
[51] Int. Cl...........................................F16d 25/00
[58] Field of Search........192/85 A, 85 AA, 41 R, 45, 192/54, 83

[56] References Cited

UNITED STATES PATENTS 2,587,823  3/1952  DePew...................192/85 AA
2,876,881  3/1959  Parrett...................192/85 AA
3,255,854  6/1966  Shroter et al..............192/54

Primary Examiner—Benjamin W. Wyche
Attorney—W. E. Finken et al.

[57] ABSTRACT

A self-energizing clutch having a pair of leaf springs forming a ramp for a ball between the clutch pack and the engaging piston. One spring applies a light force to the ball which starts the ball up the ramp when the output of the clutch overdrives the input. The other spring is then deflected to provide a higher force to complete the engagement of the clutch.

2 Claims, 5 Drawing Figures

PATENTED SEP 5 1972
3,688,882
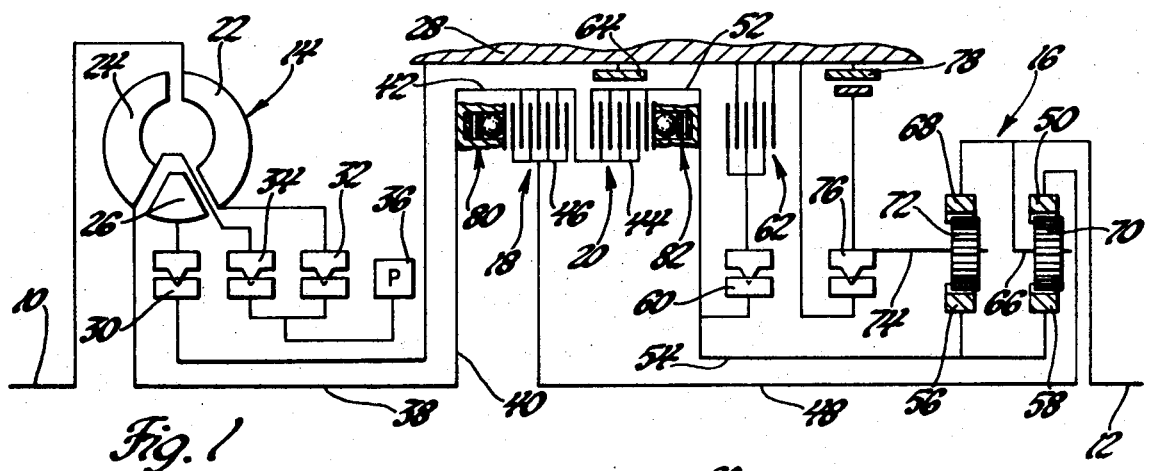
Fig. 1
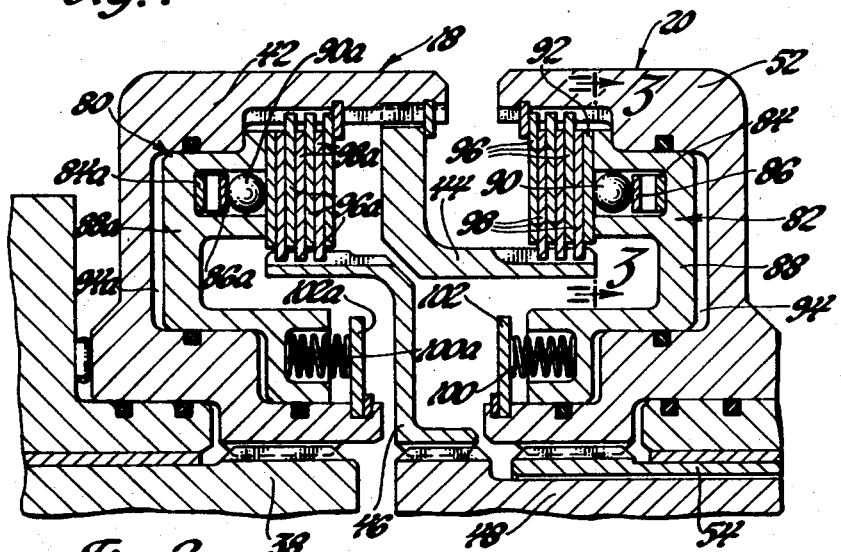
Fig. 2
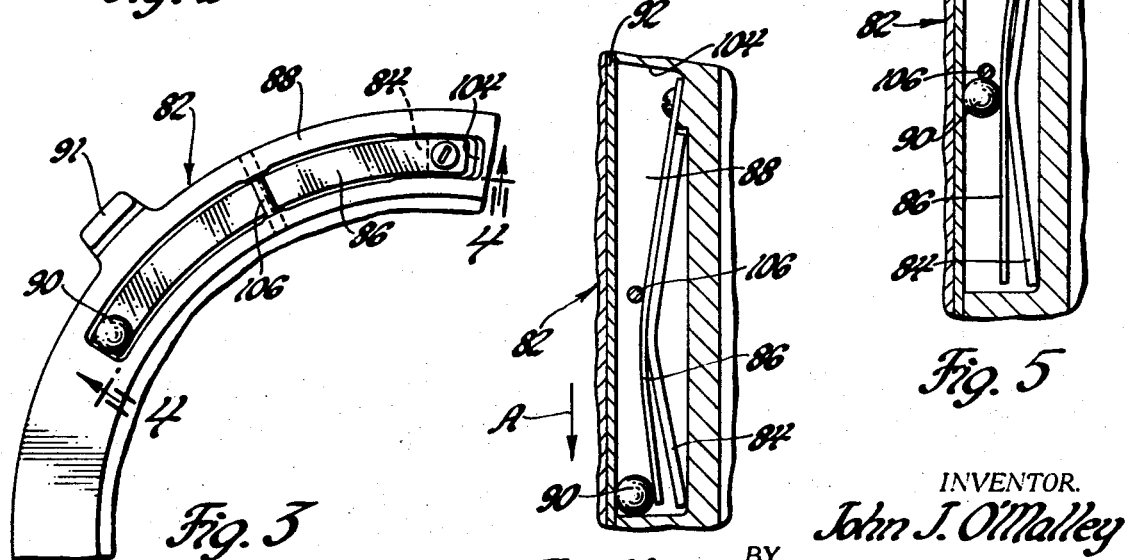
Fig. 3
Fig. 4
Fig. 5
INVENTOR.
John J. O'Malley
BY Donald F. Scherer
ATTORNEY

FLUID OPERATED CLUTCH WITH ONE WAY ENGAGER

This invention relates to power transmissions and more particularly to power transmissions having self-energizing clutches for back-up drive to the converter.

The invention described herein is useful in a transmission wherein it is desirable to maintain fluid pressure to operate the various fluid operated friction devices and to provide a drive from the output shaft to the input shaft when the vehicle is coasting with no engine power or when the vehicle is being pushed. Prior art transmissions have used either a positive displacement pump driven by the transmission output shaft to provide these functions or one-way drive devices connected directly between the output shaft and the input shaft to provide these functions. The addition of a positive displacement fluid pump connected to the output shaft increases the over-all cost of the transmission and quite often the over-all package size. The use of one-way drive devices between the output shaft and the input shaft of the transmission is not always possible or feasible depending upon gearing arrangement which is used in the transmission. This arrangement also results in increased cost of the transmission.

The present invention provides a back-up drive from the output shaft to the input shaft through the use of mechanical engagement of the input clutches. When the output shaft attempts to over-drive the input shaft, if the input clutches are not fluid operated at that time, tee mechanical devices will cause the clutches to be engaged and thereby provide a drive from the output shaft to the turbine of the converter. The turbine is connected through a one-way drive to the positive displacement pump which supplies fluid for the torque converter and the transmission control. Thus, on coast with the engine not operating, the positive displacement pump is driven to supply fluid to the torque converter and the transmission control to engage the various friction devices in the transmission and to provide fluid to the torque converter A torque converter when it is filled with fluid will provide a drive to the engine. Also, the positive displacement pump may be used to supply other operating apparatus such as power steering, brakes and load levelers, etc., which apparatus it is desirable to have operate when the vehicle is coasting without engine power.

The mechanical engagement device in the preferred embodiments includes a cantilever type spring disposed in the piston of the input clutches which applies a tickler force to a ball disposed between the spring and one of the disc members of the input clutch. The spring is formed so that it provides an angular ramp relative to the friction disc so that whenever the friction disc or piston is driven by the output shaft at a speed greater than the clutches being driven by the input shaft, the ball will roll up the ramp to apply an engagement force to the friction disc thereby applying a clutch. A second spring member, between the piston and the first spring applies a larger force for engaging the clutch when the first spring is deflected away as the ball is driven up the ramp. A stop member is provided to limit the travel of the ball up the ramp at which point the apply force is limited by the spring deflection. When the piston is fluid operated during normal operation of the clutch, the spring is deflected as the clutch piston moves toward the friction disc so that excessive loads are not placed on the friction disc by the ball.

It is an object of this invention to provide in a transmission an improved mechanical self-energizing mechanism for the input clutch including two spring members and a ball operable to provide a back-up drive from the output shaft to the input shaft during vehicle coasting with the engine off.

It is another object of this invention to provide in an improved transmission a mechanical energizing mechanism including a tickler spring, a main spring and a ball which are operable to energize the input clutch during a back-up drive condition and means for limiting the clutch apply force.

These and other objects and advantages of the present invention will be more apparent from the following description and drawings in which:

FIG. 1 is a schematic representation of the transmission;

FIG. 2 is a cross-sectional elevational view of the input clutches of the transmission shown schematically in FIG. 1;

FIG. 3 is an end view of the ball and ramp taken along line 3—3 of FIG. 2;

FIG. 4 is a sectional view of the ball and ramp taken along line 4—4 of FIG. 3; and FIG. 5 is a view similar to FIG. 4 showing the ball in a different position.

Referring to the drawings wherein like characters designate like or corresponding parts throughout the several views there is shown in FIG. 1 a power transmission including input shaft 10, an output shaft 12, a torque converter 14, a planetary gearing arrangement 16 and a pair of input clutches 18 and 20. The torque converter 14 includes an impeller 22 driven by the input shaft 10, a turbine 24 and a stator 26 which is connected to the transmission case 28 through a one-way device 30. The pump 22 and turbine 24 are connected by one-way drive devices 32 and 34 respectively to a conventional positive displacement pump 36 which supplies fluid pressure in a conventional manner to operate the clutches and brakes of the transmission. More detailed description of the torque converter 14, and the one-way drives 32 and 34 can be found in U.S. Ser. No. 122,041 filed in the name of E. A. Koivunen and assigned to the assignee of this application.

The turbine 24 drives an input shaft 38 which is connected through a hub 40 to drive an outer hub 42 and an inner hub 44 of the input clutches 18 and 20 respectively. An inner hub 46 of clutch 18 is connected by a shaft 48 to ring gear 50 of the planetary gearing arrangement 16. An outer hub 52 of the input clutch 20 is connected via shaft 54 to a pair of sun gears 56 and 58 of the planetary gear set 16. The hub 52 and shaft 54 are also connected via a one-way brake 60 to a selectively operable friction brake 62 which is operatively connected with the transmission housing 28. The hub 52 may also be selectively held stationary by a band type brake 64 which is operatively connected with the transmission housing 28. The output shaft 12 is drivingly connected to a carrier 66 and a ring gear 68 which are members of the planetary gearing 16. The planet carrier 66 rotatably supports a plurality of plane pinions 70 which mesh with the sun gear 58 of the ring gear 50. The sun gear 56 is operatively connected with the ring gear 68 through a plurality of planetary pinions 72 which mesh therewith and are rotatably mounted on a planet carrier 74 which is operatively connected through a one-way device 76 with the transmission housing 28 and through a selectively operable band brake 78 with the transmission housing 28. The gearing arrangement shown herein is described in detail in the U.S. Pat. issued to Winchell et al. No. 3,321,056 and reference may be had thereto to determine the detailed operation of the transmission. It is sufficient here to note that the transmission will provide three forward speeds and a reverse speed by selective operation of the various clutches and brakes. A suitable control for the operation of the clutch and brakes is also found in Winchell et al.

The transmission as described in Winchell et al. will not provide a back-up drive from the output shaft 12 to the torque converter 14 if the positive displacement pump 36 is not driven by the input. The transmission shown in FIG. 1 differs from Winchell in that mechanical engaging or energizing mechanisms 80 and 82 disposed in input clutches 18 and 20, respectively, will initiate a clutch engagement to permit a back-up drive between the output shaft 12 and the torque converter 14 when the positive displacement pump 3 is not being driven.

The engaging mechanisms 80 and 82 are similar in construction and are shown in more detail in FIGS. 2 through 5. The engaging mechanism 82 is disposed in the input clutch 20 and includes a main leaf spring 84 and a tickler leaf spring 86 disposed in a clutch piston 88 which is slidably mounted in the hub 52 and a ball 90 disposed adjacent the leaf spring 86.

The clutch piston 88 drivingly connected to the hub 52 by a plurality of tangs 91 spaced about the periphery thereof and engaging slots, not shown, in the hub 52. The ball 90 abuts a free floating plate or disc 92 which normally rotates with the piston 88. When the clutch 20 is not engaged, relative rotation occurs between friction discs 96 drivingly connected to the hub 52 and friction discs 98 drivingly connected to the hub 44. Slippage also occurs between disc 92 and friction disc 98 adjacent thereto. In normal operation, the clutch 20 is engaged by fluid pressure admitted to a chamber 94 formed between the housing 52 an the piston 88. When the fluid chamber 94 is pressurized the piston 88 urges the disc 92 toward friction disc 98 to cause a friction engagement between disc 92 and friction disc 98 and also between the disc 96 and the discs 98 thus providing a drive connection between shaft 38 and the shaft 54. When the chamber 94 is not pressurized a plurality of coil springs 100 compressed between a piston 88 and a washer 102 secured in the hub 52 urges the piston away from the friction disc to disengage the clutch 18. In the disengaged position the ball 90 still contacts the spring 86 and the disc 92.

The clutch 18 and the mechanical energizing mechanism 80 are similar in design and structure to the clutch 20 and the energizing mechanism 82 so that the corresponding parts have been given the same numerical designation with an *a* suffix. As seen in FIG. 3, the leaf springs 86 and 84 are arcuate in shape and are disposed in a spring pocket 104 in the clutch piston 88. The springs 84 and 86 are arranged so that three springs may be placed in three separate spring pockets around the piston 88. The tickler spring 86 has a light preload force which maintains the ball 90 in contact with the disc 92 so that only a light drag pressure is applied between the disc 92 and the disc 98. However, when the hub 52 and piston 88 are driven by the output shaft 12 through the gearing 16 and shaft 54, such as when the vehicle is coasting with the engine stalled or when the vehicle is being pushed, the piston 88 will be rotated in the direction of arrow A shown in FIG. 4 relative to the disc 92 to cause the ball 90 to roll up the ramp formed by the spring 86. As the ball 90 moves up the ramp 86 the spring force will cause the disc 92 to move away from piston 88 thereby causing the friction discs 96 and 98 to be engaged with increasing force and also causing the spring 86 to deflect toward the spring 84. When the spring 86 has deflected sufficiently to permit contact between the springs 86 and 84, at the point at which the ball 90 contacts the spring 86, the engagement force on the clutch will increase quite rapidly since the spring 84 has a very high spring rate. As seen in FIG. 5 the ball 90 will come to rest against the pin 106 after the ball has moved a predetermined amount from its rest position. At this point it is seen that both springs 86 and 84 are deflected and apply a force to the disc member 92. The pin 106 limits the movement of the ball and therefore limits the further deflection of the springs 84 and 86 thus limiting the apply force for the clutch 20. The amount of travel of the ball 90 along the spring ramp depends on the torque capacity requirements of the clutch. If the requirement is high, the ball 90 will move along the ramp until the pin 106 is contacted. If the torque requirement is low, the ball will not move to the pin 106. The movement of the ball 90 along the spring ramp will cease when the torque capacity of the clutch is equal to the torque requirement. Thus, the clutch is automatically controlled and its capacity is limited by the spring ramp. The pin 106 limits the maximum amount of clutch engagement.

If the clutch 20 is hydraulically engaged, when the ball 90 is in the position shown in FIG. 5, the springs 84 and 86 will deflect further to permit the plate 2 to abut the piston 88. This deflection is within the operative spectrum of the springs. This may occur for example if the vehicle is coasting with the engine off and the transmission control conditioned for a forward or reverse drive when either or both clutches are mechanically engaged. The pump 36 will supply fluid to engage the various friction devices of the transmission and other accessory units to which it is connected, such as power steering and power brakes. The clutches will also be engaged if the vehicle coasts in neutral with the engine off. However, under this condition the clutches will not be hydraulically engaged by the pump 36. The pump 36 will continue to supply accessory units as discussed above.

The mechanical engaging mechanism 80 is similar to the mechanism 82. Its operation is the same with the exception that in the clutch 18 the disc 98*a* is driven by the output shaft when the vehicle is in a back-up drive condition so that the friction disc 98*a* driven by the hub 46 initiates movement of the ball 90*a* to energize the clutch 18 while in clutch 20 movement of the piston 88 relative to the disc 92 initiates movement of the ball 90 to energize the clutch.

Obviously, many modifications and variations of the present invention are possible in light of the above teachings. It is, therefore, to be understood that within the scope of the appended claims the invention may be practiced otherwise than as specifically described.

What is claimed is:

1. A self-energizing clutch, for use in a transmission having, input means and output means comprising; fluid operated clutch means for transmitting power from said input means to said output means when said clutch is fluid operated and including an input member, an output member, piston means operatively connected with one of said members, friction disc means operatively connected with said other member; spring means including first and second spring members disposed in said piston means at an angle relative to said friction disc means, and ball means disposed between said spring means and said friction disc means to impose a light force from said first spring member on said friction disc means; said output member at times being driven by said output means to cause said output means to rotate faster than said input member thereby establishing relative rotation between said piston means and said friction disc means and said ball means being moved along said spring means due to the relative rotation to deflect said spring means to impose a heavy force on said friction disc means from said second spring member to engage said clutch means mechanically to permit a drive force to be transmitted from said output means to said input means 2. A self-energizing clutch, for use in a transmission having, input means and output means comprising; fluid operated clutch means for transmitting power from said input means to said output means when said clutch is fluid operated and including an input member, an output member, piston means operatively connected with one of said members, friction disc means operatively connected with said other member; spring means including first and second spring members disposed in said piston means at an angle relative to said friction disc means; ball means disposed between said spring means and said friction disc means to impose a light force from said first spring member on said friction disc means; said output member at times being driven by said output means to cause said output member to rotate faster than said input member thereby establishing relative rotation between said piston means and said friction disc means and said ball means being moved along said spring means due to the relative rotation to deflect said spring means to impose a heavy force on said friction disc means from said second spring member to engage said clutch means mechanically to permit a drive force to be transmitted from said output means to said input means; and stop means to limit the torque capacity of the clutch.

* * * * *